US009439066B2

(12) United States Patent
Meszaros et al.

(10) Patent No.: US 9,439,066 B2
(45) Date of Patent: Sep. 6, 2016

(54) METHODS, COMPUTER PROGRAM PRODUCTS AND APPARATUSES ENABLING TO CONCEAL LAWFUL INTERCEPTION FROM NETWORK OPERATORS

(75) Inventors: Akos Meszaros, Budapest (HU); Andras Janko, Érd (HU)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/407,688

(22) PCT Filed: Jun. 13, 2012

(86) PCT No.: PCT/EP2012/061137
§ 371 (c)(1),
(2), (4) Date: Feb. 20, 2015

(87) PCT Pub. No.: WO2013/185805
PCT Pub. Date: Dec. 19, 2013

(65) Prior Publication Data
US 2015/0172915 A1    Jun. 18, 2015

(51) Int. Cl.
*H04M 3/42* (2006.01)
*H04W 12/02* (2009.01)
*H04M 3/22* (2006.01)
*H04M 15/00* (2006.01)
*H04L 29/06* (2006.01)

(52) U.S. Cl.
CPC ............ *H04W 12/02* (2013.01); *H04L 63/304* (2013.01); *H04M 3/2218* (2013.01); *H04M 3/2281* (2013.01); *H04M 15/39* (2013.01); *H04M 15/47* (2013.01)

(58) Field of Classification Search
None
See application file for complete search history.

(56) References Cited

U.S. PATENT DOCUMENTS

| 2002/0103899 | A1* | 8/2002 | Hogan | H04M 3/4228 709/224 |
| 2005/0152509 | A1* | 7/2005 | Nelson | H04M 3/2254 379/32.05 |
| 2006/0227947 | A1* | 10/2006 | Benco | H04M 3/205 379/133 |
| 2010/0316195 | A1* | 12/2010 | Di Serio | H04L 63/00 379/32.01 |

OTHER PUBLICATIONS

International Search Report dated Apr. 24, 2013 corresponding to International Patent Application No. PCT/EP2012/061137.
ETSI ES 201 671 V3.1.1 (May 2007) "Lawful Interception (LI); Handover interface for the lawful interception of telecommunications traffic"; pp. 1-124; European Telecommunications Standards Institute (ETSI); 650, Route des Lucioles; F-06921 Sophia-Antipolis; France.

* cited by examiner

*Primary Examiner* — Adolf Dsouza
(74) *Attorney, Agent, or Firm* — Squire Patton Boggs (US) LLP

(57) ABSTRACT

Certain embodiments propose to conceal interception from network operators by receiving a setup message to set up a monitoring connection towards another entity (e.g. an ISUP IAM), analyze the received setup message, and responsive thereto, establish the monitoring connection towards the another entity. The control unit is further configured to confirm that a preconfigured identifier representative for a lawful interception is included within the setup message (e.g. inside the field Called Party Subaddress, under Operator ID—octets 4, 5 and 6), and responsive thereto, suppress at least partially a generation of data records for the monitoring connection.

16 Claims, 5 Drawing Sheets from ES201671

Table E.3.4: Called party subaddress

| Bits | | | | | | | | Octets |
|---|---|---|---|---|---|---|---|---|
| 8 | 7 | 6 | 5 | 4 | 3 | 2 | 1 | |
| Called party subaddress identifier | | | | | | | | 1 |
| Length of called party subaddress contents | | | | | | | | 2 |
| Type of subaddress = user specified, odd/even indicator | | | | | | | | 3 |
| Operator-ID ② | | | | Operator-ID ① | | | | 4 |
| Operator-ID ④ | | | | Operator-ID ③ | | | | 5 |
| Field separator | | | | Operator-ID ⑤ | | | | 6 |
| CIN ② | | | | CIN ① | | | | 7 |
| CIN ④ | | | | CIN ③ | | | | 8 |
| CIN ⑥ | | | | CIN ⑤ | | | | 9 |
| CIN ⑧ | | | | CIN ⑦ | | | | 10 |
| CCLID ② | | | | CCLID ① | | | | 11 |
| CCLID ④ | | | | CCLID ③ | | | | 12 |
| CCLID ⑥ | | | | CCLID ⑤ | | | | 13 |
| CCLID ⑧ | | | | CCLID ⑦ | | | | 14 |
| Field separator | | | | CCLID ⑨ | | | | 15 |
| (see note) | | | | | | | | 16 |
| | | | | | | | | 17 |
| | | | | | | | | 18 |
| | | | | | | | | 19 |
| | | | | | | | | 20 |
| | | | | | | | | 21 |
| | | | | | | | | 22 |
| | | | | | | | | 23 |

NOTE: The Octets after the final field (CCLID) of the Called Party Subaddress are reserved for national use, e.g. for authentication purposes.

Fig. 1

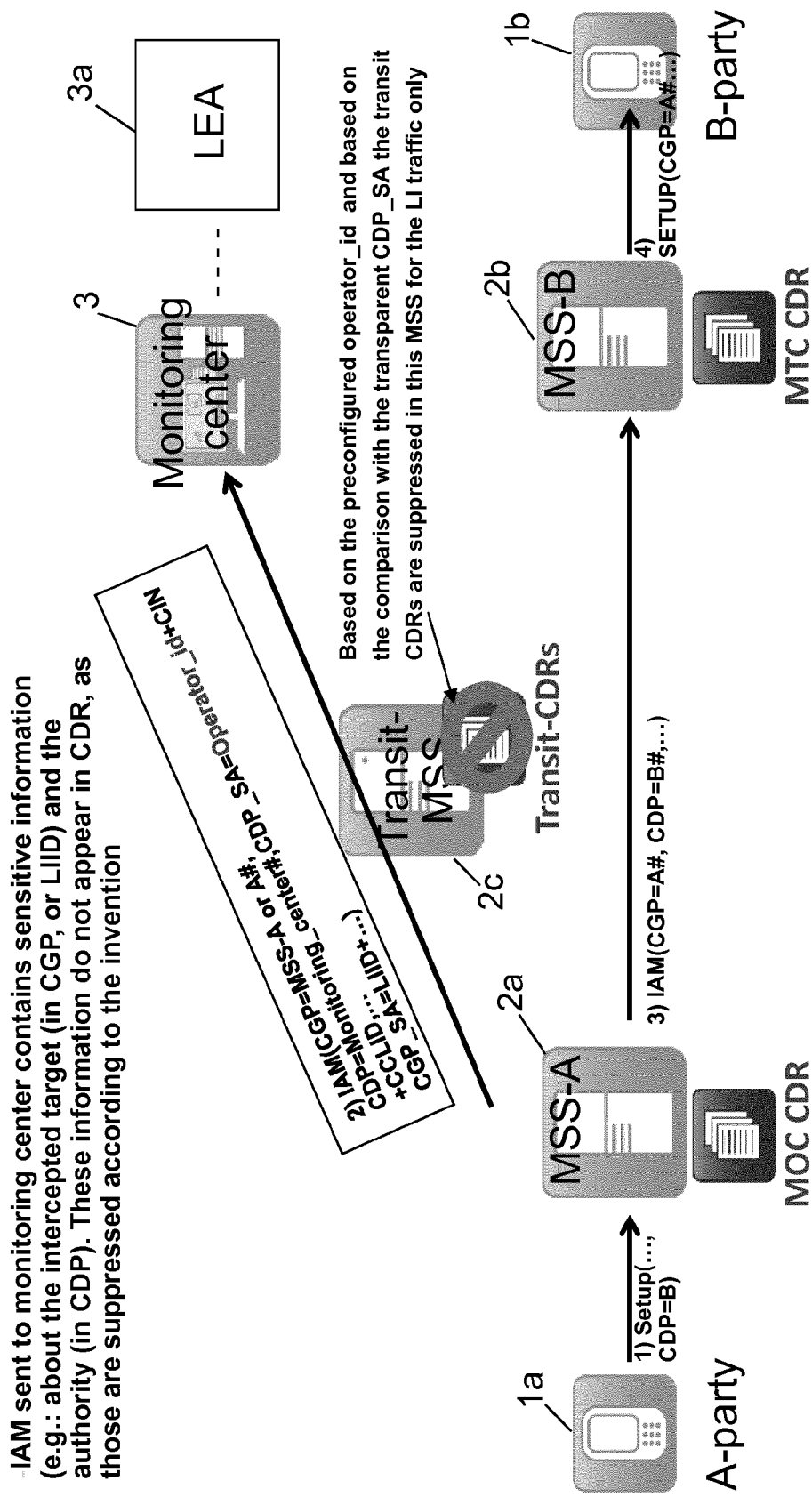
Fig. 2 (Calling-party monitored)

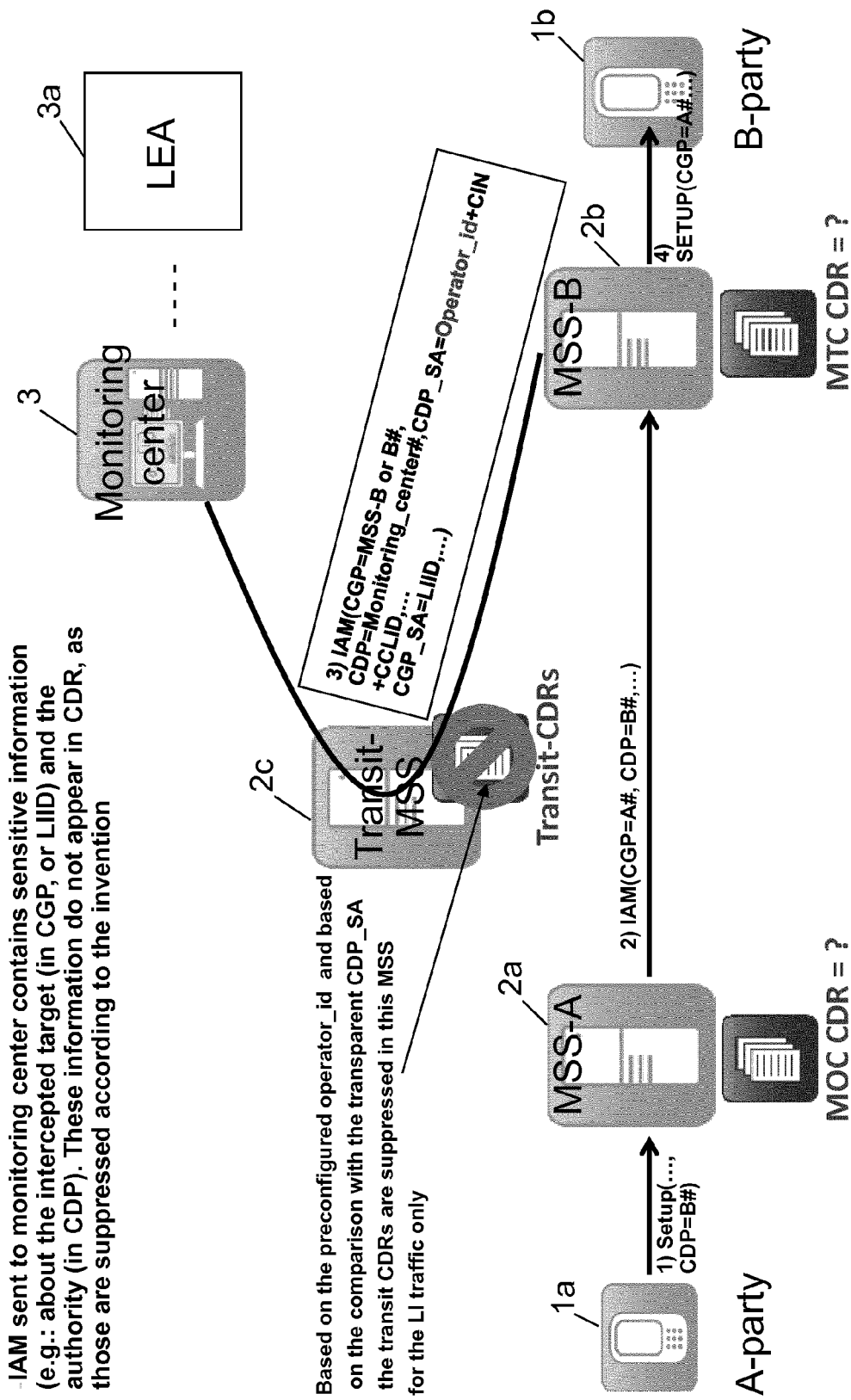
Fig. 3 Called-party monitored

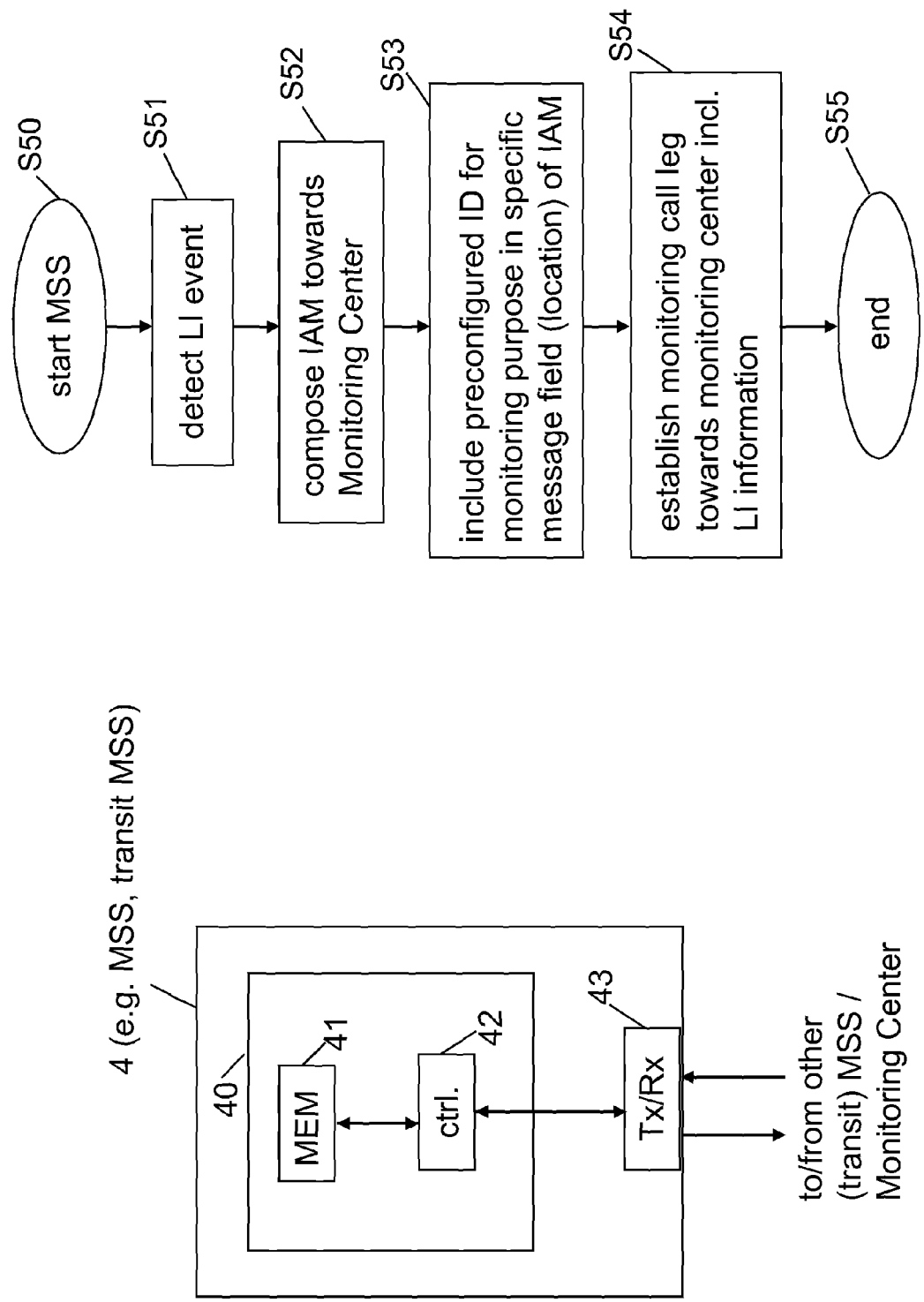

METHODS, COMPUTER PROGRAM PRODUCTS AND APPARATUSES ENABLING TO CONCEAL LAWFUL INTERCEPTION FROM NETWORK OPERATORS

FIELD OF THE INVENTION

The present invention relates to methods, computer program products and apparatuses enabling to conceal interception from network operators

BACKGROUND

Mobile data transmission and data services are constantly making progress. With the increasing usage of mobile communication, also an increased need for lawful interception (LI) arises for law enforcement authorities (LEA), e.g. police or other state security agencies.

The present invention relates in particular but without limitation to mobile communications, for example to environments under WCDMA, LTE™ (Long Term Evolution), UMTS (Universal Mobile Telecommunication System), 3GPP ($3^{rd}$ Generation Partnership Project) or any other communication scenario, potentially standardized by ETSI (European Telecommunication Standards Institute) and/or other local or regional standardization bodies, and can advantageously be implemented as or in chipsets, or modules, or units, or apparatuses of devices (e.g. network entities) forming part of those networks.

More particularly, the present invention relates to those apparatuses/units of devices or network entities that are applied in such communication networks for the purposes of lawful interception.

In various standards, different names may apply for those entities. Therefore, as a mere example only that was chosen to describe a possible implementation framework of the present invention, reference is made to ETSI ES 201 671 V3.1.1 (2007-May). Abbreviations and definitions as set out in that document shall also apply for the purpose of describing at least concepts/embodiments of this invention, though those are not intended to limit the applicability of those concepts/embodiments to other telecommunication environments.

Generally, an interception target is named "A party" or "B party", with "A Party" denoting that s/he initiates the call, while "B party" denoting that s/he receives the call. In connection with interception of such a target, a network's internal interception function (IIF)

delivers so called intercept related information (IRI) via an internal network interface (INI) to an IRI mediation function, and from there onwards via a HI2 interface to the LEA domain (e.g. represented by a LEMF (Law Enforcement Monitoring Facility, designated as the transmission destination for the results of interception relating to a particular interception subject); and likewise delivers so called content of communication (CC) to/from the intercepted target via the internal network interface (INI) to an CC mediation function, and from there onwards via a HI3 interface to the LEA domain.

Such architectural/functional relationship is for example illustrated in FIG. 1 of the a.m. ETSI document.

In case of lawful interception, one of the main requirements is that of course an intercepted user but also a network operator should not notice whether there is ongoing interception in its network. This means that at least in some countries it is not allowed to generate Charging Data Records (CDR) (some times also referred to as call detail records) also in relation to a monitoring call leg. A monitoring call leg denotes a communication channel or connection established from an interception point at which the communication between A and B party is intercepted towards a monitoring center associated and/or connected to the LEA.

In the chosen example scenario, such a monitoring call leg is carried via interface HI3 according to the ES201671, and is a standard ISDN call, based on 64 kbit/s circuit switched bearer connection (see ES201671 V3.1.1 Annex A.4.1.). However, reference to a circuit switched connection is a mere example only, and embodiments of the invention may also be applied to packet switched connections. Also, ISDN is a mere example only, and embodiments of the invention may also be applied to other call types, such as multimedia calls, or the like.

Since the monitoring call leg in this example is a standard ISDN call, there is no indication whether such monitoring call is a monitoring call or "just" a normal call.

Hence, when such a call leaves a network entity in charge of the call/connection switching such as an MSS, i.e. MSC server (MSC=Mobile Switching Center) and goes through another MSS towards the lawful interception/law enforcement authority in a $2^{nd}$ MSS (also referred to as transit MSS), there is no indication about whether it is a monitoring call or not.

This in turn implies that even in a transit MSS, CDRs will be generated for the monitoring call leg. Hence, in that case, it will be visible for the operator that lawful interception is ongoing.

Hence, a concept is required to enable that even in such scenarios involving a transit MSS, the operator is not becoming aware of ongoing interception.

Hence, there is still a need to find a solution that will preserve stealth of an ongoing interception even in case the content of communication data will be routed via an intermediate MSS, i.e. transit MSS, towards a law enforcement authority.

Thus, there is still a need to further improve such systems.

SUMMARY

Various aspects of examples of the invention are set out in the claims.

According to a first aspect of the present invention, there is provided an apparatus as set out in claim 1 and a method as set out in claim 8.

Advantageous further developments are as set out in respective dependent claims.

According to a second aspect of the present invention, there are provided computer program products, as set out in claim 15, comprising computer-executable components which, when the program is run on a computer, are configured to implement and/or carry out the above method aspects. Those computer program product/products may be embodied as a computer-readable storage medium.

Thus, improvement is based on methods, apparatuses and computer program products enabling, according to at least one or more embodiments:

to conceal an ongoing interception even in case the content of communication data is routed via an intermediate MSS, i.e. transit MSS, towards a law enforcement authority;

to suppress generation of charging data record (CDR), particularly suppression of those CDR's in lawful interception scenarios for a monitoring call leg, insofar as at least partially a generation of data records is suppressed in the sense that sensitive information is not contained; and an extra benefit may reside in the fact that the transit-MSS can also hide/suppress statistical reports about the monitoring calls (as in statistics, basically the same problem exists like in charging: sensitive information might appear in the statistical reports, unless these informations are suppressed/removed).

BRIEF DESCRIPTION OF DRAWINGS

For a more complete understanding of example embodiments of the present invention, reference is now made to the following descriptions taken in connection with the accompanying drawings in which:

FIG. 1 illustrates an example of a usable message data format according to the referenced ETSI standard;

FIG. 2 illustrates an example scenario in which a calling party is intercepted or monitored;

FIG. 3 illustrates another example scenario in which a called party is intercepted or monitored;

FIG. 4 illustrates a basic block circuit diagram of a network entity such as a MSS or also a transit MSS in which embodiments of the present invention are implemented;

FIG. 5 illustrates an example of a processing flowchart for a network entity such as a MSS.

DESCRIPTION OF EXEMPLARY EMBODIMENTS

Figure 6:
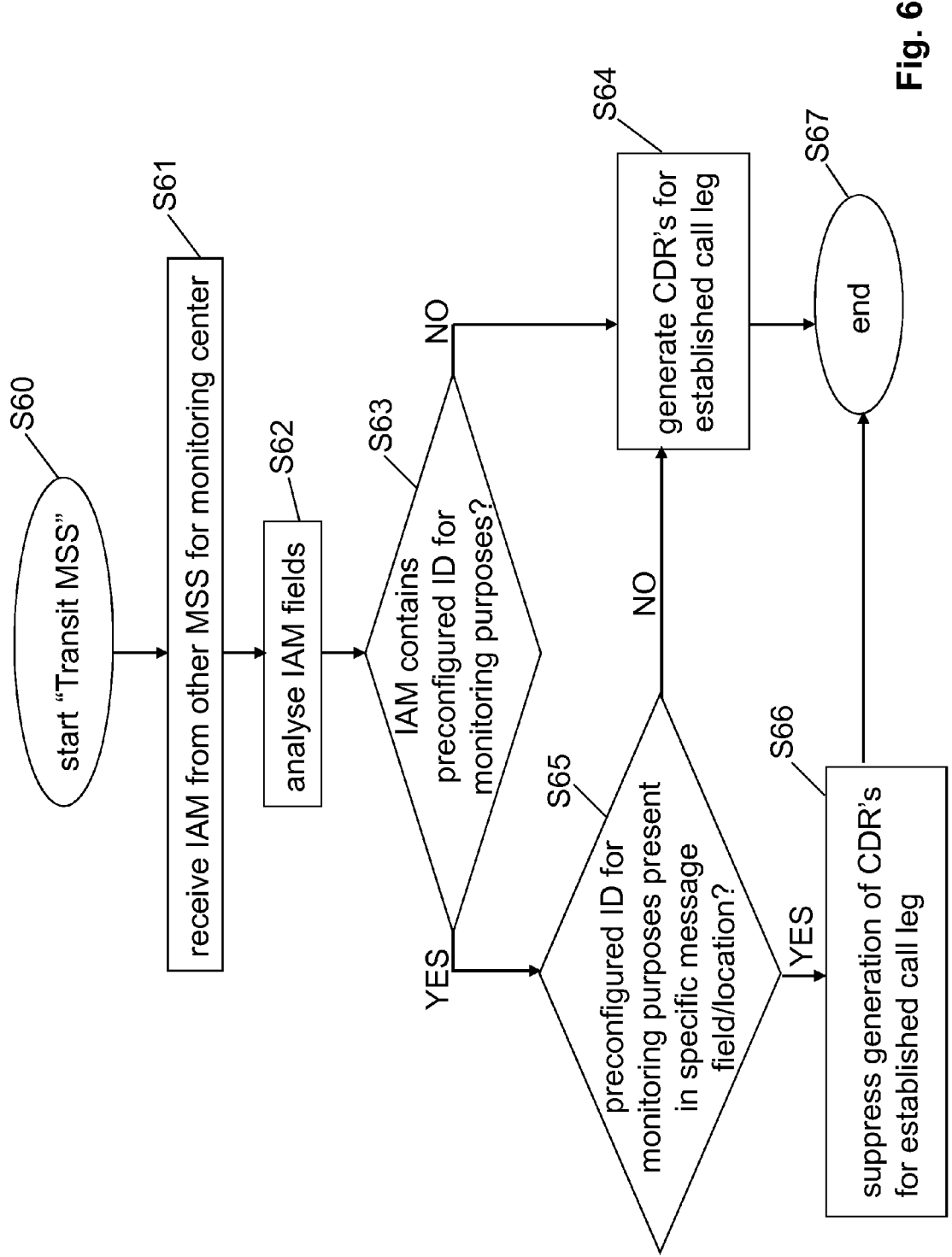
FIG. 6 illustrates an example of a processing flowchart for a network entity such as a transit MSS.

Example aspects of the invention will be described herein below.

In brief, according to one example or embodiment, in the above referenced ETSI standard, to which reference is made as a mere example only, there is the so called correlation information, which is sent in the Calling and Called Party Subaddress field in an initial address message, i.e. the IAM. In the Called Party Subaddress, one of the fields is the Operator ID (Octets 4, 5, 6), which is a configurable parameter in the MSS (See ES 201671 V3.1.1, annex E.3.2, Field order and layout). Since this subaddress is needed for the monitoring centre (authority equipment), this field propagates through all the MSSs. Hence, also in the Transit MSS it can be checked the Called Party Subaddress of the IAM whether it contains the predefined Operator ID, and (at least optionally) whether this is in the right place, and if those match with each other, then the PSTN call leg (monitoring call leg) is found to be a monitoring call. If this is detected, then the CDR generation is suppressed for this monitoring call leg. In Transit MSS, it is detectable whether the call is a monitoring call leg or not and if yes, then all the CDRs can be suppressed for that call leg. In this way, an operator will not know whether there is ongoing lawful interception in his network.

Generally, the invention is implemented in a mobile communication network.

FIGS. 2 and 3 illustrate example scenarios concerning interception or monitoring of either a calling party (FIG. 2) or a called party (FIG. 3). Firstly, in order to enhance understanding of the illustrated scenarios, devices/entities involved will be described. As shown in both Figures, FIG. 2 and FIG. 3, a terminal A-party denoted by numeral 1a communicates with another terminal B-party denoted with numeral 1b. This communication is accomplished via the intermediary of an MSC server MSS-A denoted by numeral 2a and a further MSC server MSS-B denoted by numeral 2b. A respective terminal 1a, 1b can be a mobile station MS or a user equipment UE, for example a mobile phone or a smartphone or a personal computer/laptop connected to the mobile communication network. When setting up communication between A-party and B-party, A-party sends in a first message a setup including at least the address of the called party CDP=B. This message is sent towards the MSS-A. The MSS-A then forwards a message including the calling party address CGP=A# and the called party address CDP=B#, and so on which is forwarded to MSS-B 2b. The MSS-B 2b forwards the setup message to the terminal 1b informing him of the calling party's address so that this setup message contains at least CGP=A#. The MSS-A generates MOC (Mobile Originated Call) CDRs and the MSS-B generates MTC (Mobile Terminated Call) CDRs. Further, in case the calling party A is to be monitored by lawful interception authorized by law enforcement authority, the MSS-A, responsive to the setup message received from A-party, sends an initial address message (message 2 in FIG. 2) towards the monitoring center 3 which is associated and/or connected to the law enforcement authority 3a. The initial address message passes through at least one transit MSC server. A transit MSC server can, for example, be a gateway MSC server or other MSC server. It is also to be noted that depending on the access point of a calling or called party, any MSS can take the role of a transit MSS depending on certain circumstances. Thus, functionalities in relation to the present invention describe distinctively for MSS-A and MSS-B on one side and the transit MSS on the other side are of course present simultaneously in each MSS but activated depending on the specific role in specific circumstances of the irrespective MSS.

With reference to FIG. 2, MSS-A represents a network entity equipped with an apparatus comprising a control unit (see FIG. 4 for other details). The control unit is thus configured to detect a trigger for lawful interception of the calling A-party and responsive thereto, to compose a setup message to setup monitoring connections towards another entity, i.e. the monitoring center 3, and further to establish such monitoring connection towards said another entity. The control unit is further configured to compose the setup message in such a manner as to include a preconfigured identifier representative for lawful interception and to set a setup message. That is, the initial address message sent to the monitoring center contains, within the called party subaddress, an operator ID as a preconfigured identifier representative for lawful interception. Such operator ID is preconfigured in all the MSSs of the network of a given operator.

Hence, in such particular example, the control unit is also configured to include said preconfigured identifier in a specific message field within said message and further, at least optionally, to include said preconfigured identifier in a subfield identifying said another entity to which the monitoring connection is established (the called party in the initial address message 2 in FIG. 2 is directed to the monitoring center as a called party in this call leg). Also, the control unit is further configured to include said preconfigured identifier at a specific location within said subfield identifying said another identity. Namely, the identifier is the operator ID in the called party subaddress and, within this subaddress, several octets can be chosen or defined as a specific location in which that operator ID representative for lawful interception is to be included (see FIG. 1 where five octets are available within the called party subaddress as a specific location).

Similar annotations as given herein above with reference to FIG. 2 apply likewise to FIG. 3. The difference is that the called party, i.e. B-party 1*b* is marked to be monitored and it receives a call in the illustrated example scenario. In this regard, MSS-B 2*b* detects a trigger for lawful interception of B-party, responsive thereto composes a setup message to set up a monitoring connection towards the monitoring center as another entity and establishes the monitoring connections towards the monitoring center. Now, in this scenario of FIG. 3, MSS-B composes the setup message and includes a preconfigured identifier representative for lawful interception into said setup message (message 3 in FIG. 3), wherein the above-described operator ID is contained in the called party subaddress field, optionally also at a specific location within said subfield, as described above and as illustrated in FIG. 1.

Hitherto, the role of the MSS-A and MSS-B (2*a*, 2*b*) was described with reference to FIGS. 2 and 3. Now, the functionality of the transit MSS 2*c* shown in FIGS. 2 and 3 will be described. As already derivable from the above description, the transit MSS (e.g. a gateway MSS or the like) represents a network entity equipped with an apparatus comprising a control unit. Such apparatus and its control unit (details see FIG. 4, for example) are configured to receive a setup message to set up a monitoring connection towards another entity (message 2 from MSS-A 2*a* via transit MSS 2*c* towards monitoring center 3 in FIG. 2 and likewise message 3 in FIG. 3 from MSS-B 2*b* via transit MSS 2*c* towards monitoring center 3). The transit MSS, i.e. the control unit in the apparatus comprised therein, analyses the received setup message. Responsive to the analysis, the monitoring connection towards said another entity is established and it is further confirmed, based on the analysis, that a preconfigured identifier representative for lawful interception is included with said setup message. Responsive to such confirmation, at least partially a generation of data records for said monitoring connection is suppressed. Namely, based on the detection or verification of the preconfigured operator ID known at the MSS and included in the IAM message (e.g. in the called party subaddress field or a specific octet thereof), CDRs are suppressed from being generated in the transit MSS for the LI (Lawful Interception) traffic only. Thus, the CDRs can be fully suppressed to be generated or at least partially a generation of data records is suppressed in the sense that sensitive information is not contained. Sensitive information in connection with lawful interception means information concerning the intercepted target such as a calling party ID or lawful interception identifier as well as the authority performing lawful interception in the called party. At least this information does not appear in the CDR or not CDR at all is generated, thereby concealing the ongoing interception from the operator in whose network domain the transit MSS is located. Thus, the control unit of the apparatus forming part of the transit MSS is also configured to confirm that the preconfigured identifier is included in a specific message field and optionally to confirm that it is included in a subfield identifying said another entity to which the monitoring connection is established. Optionally, at least it is also confirmed that the preconfigured identifier is included at a specific location within such subfield.

FIG. 4 shows a basic block circuit diagram of a network entity such as a MSS and/or transit MSS in which embodiments of the present invention are implemented. The MSS as well as the transit MSS, denoted by numeral 4, comprises a interface, Tx/Rx, cf. numeral 43, for transmission to/reception from another network entity e.g. another MSS and/or a monitoring center. The interface is bidirectional connected to a control module such as a processor, e.g. a digital signal processor, DSP, or ASIC (ASIC=application specific integrated circuit), CPU (central processing unit), or the like, denoted by numeral 42. The control module is bidirectional connected to a memory module MEM, denoted by numeral 41. The memory module can be any type of memory to which data can be written and from which data can be read, e.g. a Flash memory, RAM (Random Access Memory), or also EPROM (Electrically Programmable Read Only Memory). The memory module is configured to store at least the preconfigured operator ID agreed upon to be used for interception. Thus, the memory module can be a separate memory module or a partition of a memory module storing also other user/control data handled by the transit MSS 4. Other memory modules may be present, too, in the entity. Examples of the invention can be embodied in an apparatus or unit of the transit MSS, e.g. denoted by numeral 40, comprising at least the modules 42 and 41 above.

FIG. 5 illustrates an example of a flow chart of a processing performed by a MSS such as MSS-A or MSS-B illustrated in FIGS. 2 and 3, respectively. The procedure starts in a stage S50. In a subsequent stage S51, the MSS (an apparatus/control unit thereof) detects an event regarding lawful interception of a calling or called party. Then, in a stage S52, an initial address message IAM is composed to be sent towards a monitoring center. In stage S53, in such composed IAM, a preconfigured ID for monitoring purpose is included in a specific message field (or optionally also at a specific location within such specific message field) of an initial address message. In a stage S54, a monitoring call leg is established towards the monitoring center which includes the lawful interception information such as interception-related information IRI and content of communication from the intercepted target. In a stage S55, the procedure related to the present invention in this example then ends.

FIG. 6 shows an example of a procedure as performed at a transit MSS. As shown in this example scenario, the procedure starts at a transit MSS in a stage S60. In a stage S61, the transit MSS receives an initial address message IAM from another MSS with a destination to the monitoring center. In a stage S62, the transit MSS, i.e. an apparatus or control unit thereof, analyses fields of the IAM. If in a stage S63 it is found that the IAM does not contain a preconfigured ID for monitoring purposes (NO in S63), the flow branches to stage S64 and charging detail records are generated for the established call leg. If, on the other hand, it is found in stage S63 that the IAM contains a preconfigured ID for monitoring purposes (YES in S63), the flow branches and proceeds to stage S65. In stage S65, it is checked whether the preconfigured ID for monitoring purposes is present in a specific message field and/or further optionally at a specific location within such message filed. If not (NO in S65), the flow can proceed to stage S64 and CDRs for the established call leg are generated. On the other, if YES in S65, it is determined that the IAM pertains to a monitoring call leg and then suppression of CDR generation for the established call leg is performed. This may imply that no CDRs are generated at all, or at least partially, sensitive data are omitted from CDRs, as explained above. Then, whether from stage S64 or from stage S66, the procedure advances to stage S67 where the procedure in this regard ends. Please note that S65 in another embodiment may be omitted and it may be sufficient that a preconfigured ID is present as such in the IAM. Though, in case the available numbers of preconfigured IDs for monitoring purposes are limited, a further distinctive point may be to identify a preconfigured ID also in a specific message field or even at a specific location within a specific field.

FIG. 1 shows a field used in an initial address message, e.g. a so-called called party subaddress field CDP_SA. Within the called party subaddress, the operator ID representing a preconfigured ID for monitoring purposes is possible to be included in specific locations, i.e. in octets 4, 5 and 6, with an octet representing a predetermined group of bits (one octet being formed by 8 bits) within the subfield.

Note that embodiments of the present invention may be implemented in software, hardware, application logic or a combination of software, hardware and application logic. The software, application logic and/or hardware generally resides on a module or unit, or chipset or apparatus associated to a device, i.e. mounted/inserted or mountable/insertable to or configured as a part of such a device, such as a network entity like an MSS or similar functionality.

In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

If desired, the different functions discussed herein may be performed in a different order and/or concurrently with each other. Furthermore, if desired, one or more of the above-described functions may be optional or may be combined.

Although the above description focused on an algorithm aspect, it is to be understood that the algorithm is configurable to corresponding hardware or implemented as software code loaded to a processor.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The present invention as described herein above proposes methods, computer program products and apparatuses enabling to conceal interception from network operators, and in terms of such apparatus, an apparatus, comprising a control unit configured to receive a setup message to set up a monitoring connection towards another entity, analyze the received setup message, and responsive thereto, establish the monitoring connection towards said another entity, wherein the control unit is further configured to confirm that a preconfigured identifier representative for a lawful interception is included within said setup message, and responsive thereto, suppress at least partially a generation of data records for said monitoring connection.

LIST OF ACRONYMS AND ABBREVIATIONS
AS USED HEREIN ABOVE

CDR Charging Data Record
LI Lawful Interception
LEA Law Enforcement Agency
WCDMA Wideband Code Divisional Multiple Access
LTE™ Long Term Evolution
UMTS Universal Mobile Telecommunication System
3GPP 3$^{rd}$ Generation Partnership Project
CC Content of Communication
GMSS Gateway MSS
MSS MSC Server
MSC Mobile Switching Center
IRI Intercept Related Information
PSTN Public Switched Telephone Network
ISDN Integrated Services Digital Network
ETSI European Telecommunication Standards Institute
IAM Initial Address Message
MOC Mobile Originated Call
MTC Mobile Terminated Call
LEMF Law Enforcement Monitoring Facility

What is claimed is:

1. An apparatus, comprising:
a control unit configured to
receive a setup message to set up a monitoring connection towards another entity,
analyze the received setup message, and responsive thereto,
establish the monitoring connection towards said another entity,
confirm that a preconfigured identifier representative for a lawful interception is included within said setup message, and
responsive thereto,
suppress at least partially a generation of data records for said monitoring connection to conceal the lawful interception.

2. An apparatus according to claim 1, wherein the control unit is further configured to confirm that said preconfigured identifier is included in a specific message field within said message.

3. An apparatus according to claim 1, wherein the control unit is further configured to confirm that said preconfigured identifier is included in a subfield identifying said another entity to which the monitoring connection is established.

4. An apparatus according to claim 1, wherein the control unit is further configured to confirm that said preconfigured identifier is included at a specific location within said subfield identifying said another entity.

5. An apparatus according to claim 1, wherein the setup message is an initial address message.

6. An apparatus according to claim 2, wherein the specific message field within said message is a called party subaddress field.

7. An apparatus according to claim 4, wherein the specific location within said subfield is a predetermined group of bits within the subfield.

8. The apparatus according to claim 1, wherein the data records at least partially suppressed include sensitive information.

9. The apparatus according to claim 1, wherein the control unit is further configured to suppress statistical reports about calls of the monitoring connection.

10. A method implemented in a network entity, comprising:
receiving a setup message to set up a monitoring connection towards another network entity to monitor lawfully intercepted traffic,
analyzing the received setup message, and responsive thereto, establishing the monitoring connection towards said another network entity, confirming that a preconfigured identifier representative for a lawful interception is included within said setup message, and responsive thereto, suppressing at least partially a generation of data records for said monitoring connection to conceal the lawful interception.

11. A method according to claim 10, wherein confirming further comprises confirming that said preconfigured identifier is included in a specific message field within said message.

12. A method according to claim 10, wherein confirming further comprises confirming that said preconfigured identifier is included in a subfield identifying said another network entity to which the monitoring connection is established.

13. A method according to claim 10, wherein confirming further comprises confirming that said preconfigured identifier is included at a specific location within said subfield identifying said another network entity.

14. A method according to claim 10, wherein the setup message is an initial address message.

15. A method according to claim 11, wherein the specific message field within said message is a called party subaddress field.

16. A method according to claim 13, wherein the specific location within said subfield is a predetermined group of bits within the subfield.

* * * * *